(12) United States Patent
Gupta et al.

(10) Patent No.: US 11,600,985 B2
(45) Date of Patent: Mar. 7, 2023

(54) RECURRING FAULT PROTECTION FOR WIND POWER PLANTS

(71) Applicant: VESTAS WIND SYSTEMS A/S, Aarhus N (DK)

(72) Inventors: Manoj Gupta, Singapore (SG); Janakiraman Sivasankaran, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 113 days.

(21) Appl. No.: 16/956,880

(22) PCT Filed: Nov. 20, 2018

(86) PCT No.: PCT/DK2018/050299
§ 371 (c)(1),
(2) Date: Jun. 22, 2020

(87) PCT Pub. No.: WO2019/120395
PCT Pub. Date: Jun. 27, 2019

(65) Prior Publication Data
US 2021/0083476 A1 Mar. 18, 2021

(30) Foreign Application Priority Data
Dec. 20, 2017 (DK) .......................... PA 2017 70967

(51) Int. Cl.
*H02H 3/06* (2006.01)
*H02J 13/00* (2006.01)
(Continued)

(52) U.S. Cl.
CPC ............ *H02H 3/06* (2013.01); *G05B 13/026* (2013.01); *H02J 3/0012* (2020.01); *H02J 3/381* (2013.01);
(Continued)

(58) Field of Classification Search
CPC .... H02J 3/0012; H02J 3/381; H02J 13/00002; H02J 2300/28; H02J 3/472; H02J 3/48;
(Continued)

(56) References Cited

U.S. PATENT DOCUMENTS

| 2014/0301120 | A1 | 10/2014 | Zhu et al. | |
| 2016/0069326 | A1* | 3/2016 | Menke | ................. F03D 7/0296 |
| | | | | 290/44 |
| 2016/0122945 | A1* | 5/2016 | Piechuta | ............. B01F 27/0724 |
| | | | | 162/58 |

FOREIGN PATENT DOCUMENTS

| CN | 101257209 A | 9/2008 |
| CN | 101964531 A | 2/2011 |

(Continued)

OTHER PUBLICATIONS

Danish Patent and Trademark Office, First technical examination of your patent application, PA 2017 70967, dated Jun. 27, 2018.
(Continued)

*Primary Examiner* — Ziaul Karim
(74) *Attorney, Agent, or Firm* — Patterson + Sheridan, LLP

(57) ABSTRACT

A method for operating a wind turbine generator connected to a power network to account for recurring voltage faults on the power network caused by automatic reclosure of at least one circuit breaker following a short-circuit. The method comprises: identifying a deviation of voltage level of the power network from a normal operational voltage level of the network; determining that the identified deviation fulfils criteria for automatic reclosure; and operating the wind turbine generator in a recurring fault mode if automatic reclosure criteria are fulfilled. When operating the wind turbine generator in recurring fault mode, the method comprises: monitoring the recovery of the voltage level from the deviation; categorising the recovery of the voltage as one of (Continued)

at least a strong recovery or a weak recovery; and implementing a ride-through protocol according to the category of recovery.

16 Claims, 10 Drawing Sheets

(51) Int. Cl.
  *H02J 3/00* (2006.01)
  *G05B 13/02* (2006.01)
  *H02J 3/38* (2006.01)
  *H02P 9/02* (2006.01)
  *H02J 3/46* (2006.01)
  *H02J 3/48* (2006.01)
  *H02J 3/50* (2006.01)

(52) U.S. Cl.
  CPC ........ *H02J 3/472* (2020.01); *H02J 13/00002* (2020.01); *H02P 9/02* (2013.01); *H02J 3/48* (2013.01); *H02J 3/50* (2013.01); *H02J 2300/28* (2020.01)

(58) Field of Classification Search
  CPC ...... H02J 3/50; H02J 2310/18; G05B 13/026; H02P 9/02; H02H 3/38; H02H 7/06; H02H 3/06; Y02E 10/76
  See application file for complete search history.

(56) References Cited

FOREIGN PATENT DOCUMENTS

| | | |
|---|---|---|
| CN | 102255299 A | 11/2011 |
| CN | 102290826 A | 12/2011 |
| CN | 102412599 A | 4/2012 |
| CN | 103414171 A | 11/2013 |
| CN | 104396113 A | 3/2015 |
| CN | 104538939 A | 4/2015 |
| CN | 105659461 A | 6/2016 |
| CN | 104362579 B | 9/2017 |
| EP | 2779350 A1 | 9/2014 |
| WO | 2005089257 A2 | 9/2005 |
| WO | 2008115255 A1 | 9/2008 |
| WO | 2017084675 A1 | 5/2017 |
| WO | 2017190744 A1 | 11/2017 |
| WO | 2019120395 A1 | 6/2019 |

OTHER PUBLICATIONS

Patent Cooperation Treaty, Notification of Transmittal of the International Search Report and the Written Opinion of the International Searching Authority, or the Declaration, 2017P00130WO, PCT/DK2018/050299, dated Mar. 7, 2019.

Chinese Patent Office, 1st Chinese Office Action for Application 201880075634.X dated Nov. 3, 2021.

* cited by examiner

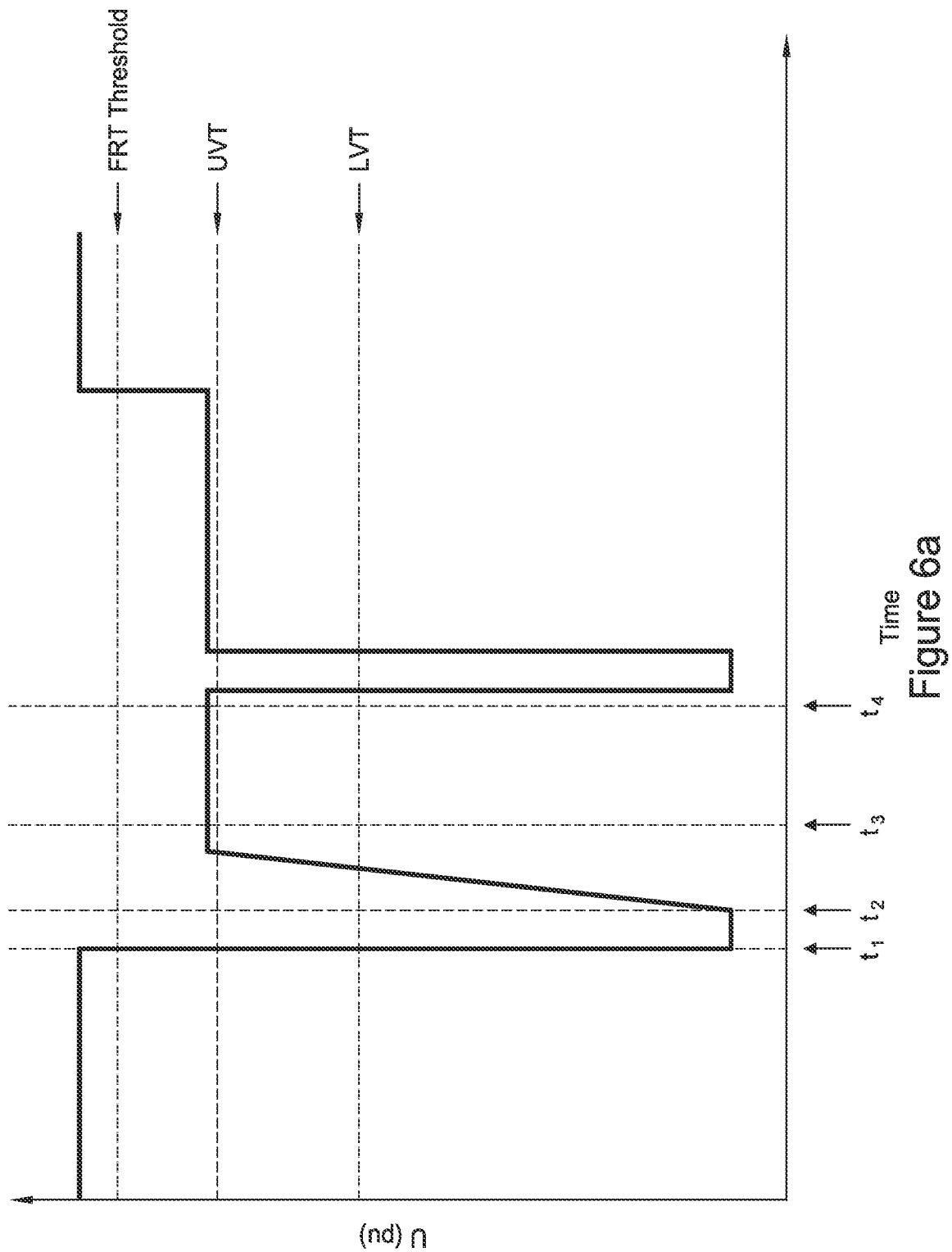

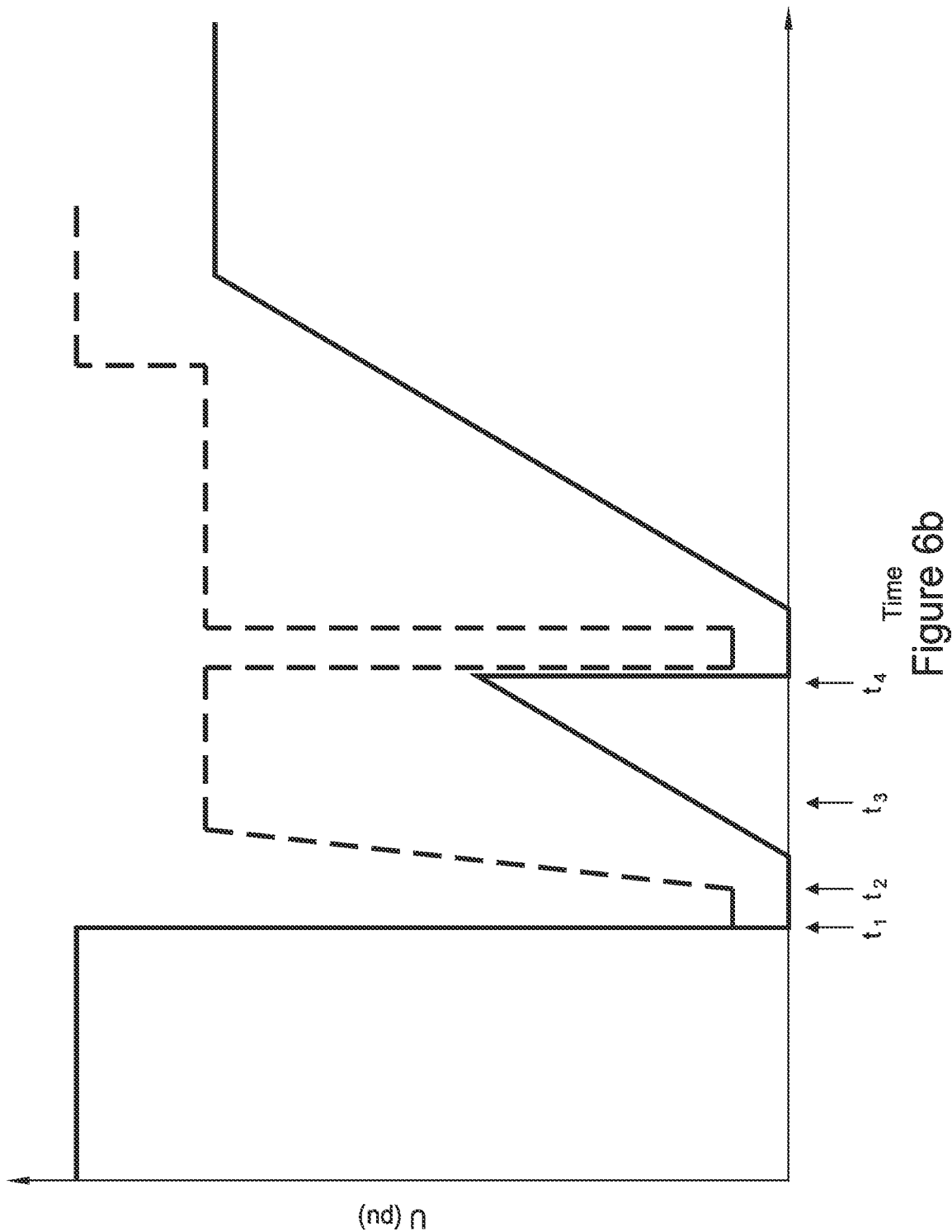

RECURRING FAULT PROTECTION FOR WIND POWER PLANTS

TECHNICAL FIELD

The present disclosure relates to methods and systems of protecting and controlling renewable energy plants. More particularly, the disclosure relates to methods of protecting wind power plants during power network faults, and especially recurring power network faults.

BACKGROUND

Wind power plants, as well as other renewable energy power plants, are expected to conform to particular requirements of the power network to which they are connected. Wind power plants, which typically comprise a plurality of wind turbine generators and are also known as a wind parks or a wind farms, are each connected to a power network or 'grid'. At the power network, the power output from each wind power plant to the network is controlled, under normal operating conditions, by a power plant control system or controller (PPC). In exceptional operating conditions, such as during a grid fault, wind turbine generators are protected by low-voltage ride-through (LVRT) and fault ride-through (FRT) protection schemes implemented by a wind turbine controller. Both the PPC and wind turbine controller implement operational limits and requirements as set out by a Transmission System Operator (TSO) or in country-specific grid interconnection requirements or 'grid codes' to achieve continuity of power supply.

Establishing continuity of power supply is particularly important to grid operation and control. A notable challenge to this continuity is presented when a transient fault occurs, which leads to a voltage dip while the line or equipment on which the fault occurred is temporarily taken offline by opening circuit breakers around the fault. Transient faults are often only temporary events, such as flash-overs across insulators or self-clearing fault on power lines, and the preferred approach on many power networks is to automatically reclose the tripped breaker after a predefined time delay to increase availability of power supply. If the fault has not been fully cleared when the breakers are reclosed, then there may be a second voltage dip, and the fault becomes a recurring fault. Until the fault clears, there may be any number of dips. Wind turbine generators are expected to remain connected to the power network through such temporary faults.

As mentioned, during external fault scenarios, each wind turbine generator is protected from voltage deviation beyond its tolerable limits by an LVRT protection scheme. The protection scheme operates to track a predefined curve during the fault, and is set to disconnect the turbine for any voltage deviation below the curve. The turbine should remain connected to the network at all other times. If a ride-through threshold is reached, the LVRT protection scheme is reset in preparation for future faults.

However, even though the turbine design and LVRT protection scheme are coordinated with the requirements of the power network, recurring fault scenarios present a problem in wind power plant operation. More precisely, operating conventional LVRT protection schemes may result in unwanted disconnection of the wind turbine generator from the power network due to the configuration of the LVRT protection scheme not taking account of recurring faults. Even when LVRT protection schemes are configured to be compliant with the network requirements relating to recurring faults, a conflict may result due to other protection systems operating in precedence to the LVRT protection scheme. This conflict impacts the ability of the LVRT protection scheme, as well as other protection schemes, to provide sufficient protection to the wind turbine generator, and so may make the wind turbine generator vulnerable to damage.

In view of the above mentioned problems there is need for protection of wind turbine generators that can sufficiently operate during recurring faults and without impacting the operation of conventional LVRT protection schemes.

SUMMARY OF THE INVENTION

According to an aspect of the present invention there is provided a method for operating a wind turbine generator connected to a power network to account for recurring voltage faults on the power network caused by automatic reclosure of at least one circuit breaker following a short-circuit. The method comprises: identifying a deviation of voltage level of the power network from a normal operational voltage level of the network; determining that the identified deviation fulfils criteria for automatic reclosure; and operating the wind turbine generator in a recurring fault mode if automatic reclosure criteria are fulfilled. In operating the wind turbine generator in recurring fault mode, the method comprises: monitoring the recovery of the voltage level from the deviation; categorising the recovery of the voltage as one of at least a strong recovery or a weak recovery; and implementing a ride-through protocol according to the category of recovery.

By implementing a recurring fault mode that is separate to conventional low-voltage ride-through modes, the method provides a protection protocol that is able to account for multiple voltage dips based upon characteristics of the recovery. In particular, by categorising the recovery, the method protects generators throughout recurring faults, whilst remaining compliant with grid requirements as is mandatory for new power plants.

Furthermore, the above method does not impact upon conventional low-voltage ride-through modes due to the determination of the deviation fulfilling particular criteria and only entering the recurring fault mode if the criteria are fulfilled. Therefore, the method acts as an augmentation to the low-voltage ride-through modes, requiring minimal or no alteration to existing hardware. Advantageously, therefore, the method can be implemented readily in both existing and new plants.

The deviation may comprise a power network fault. Determining that the deviation fulfils criteria for automatic reclosure may comprise comparing the voltage levels following the fault with a predetermined reclosure threshold.

By using a reclosure threshold, it is noted that recurring faults are most likely to happen where circuit breakers are configured to automatically reclose. Comparing voltage levels in the described manner ensures that the method is able to smoothly integrate with existing power networks.

Categorising the recovery of the voltage may comprise applying one or more tests to the recovery such that the recovery is categorised as strong recovery if it passes the, or each, test and is categorised as weak recovery if it does not pass one or more of the tests.

Preferably, the method comprises three tests, and the recovery may be categorised as strong recovery only if it passes each of the three tests.

The recovery is categorised as weak recovery unless it passes particular tests, thereby implementing a strict approach to voltage recovery. Where weak recovery is involved, there may be some danger to generators if the correct protocol is not implemented, and so the step of categorising the recovery as strong recovery only if it passes the, or each, test ensures that protection of generators can be prioritised.

The at least one test may comprise comparing the voltage level with a first voltage threshold. The test may be passed if the voltage level exceeds the first voltage threshold in a predetermined first time period. The test may be passed if the voltage level exceeds the first voltage threshold at the end of a predetermined first time period.

Beneficially, comparison of voltage level with a threshold within periods of time indicates the speed and size of the recovery adequately. It is possible that the recovery of the voltage within the particular time period is a function of the state of the grid and/or the power plant, and so can be used as a gauge or metric of the recovery.

The at least one test may comprise comparing the voltage level with a second voltage threshold. The test may be passed if the voltage level exceeds the second voltage threshold in a predetermined second time period. The test may be passed if the voltage level exceeds the second voltage threshold at the end of a predetermined second time period.

Implementation of two tiers of voltage thresholds over certain time periods is useful for computational efficiency, and for speed of implementation of ride-through protocols should the recovery fail one or more of the tests. The tests may be performed sequentially, such that failure of a first test results in the categorisation of the recovery as weak.

The second voltage threshold may be greater than the first voltage threshold. The second voltage threshold may be an upper voltage threshold, which is less than an operational voltage of the generator. The second voltage threshold may be equal to the predetermined reclosure threshold. The first voltage threshold may be a lower voltage threshold, and may be user-determined. The first voltage threshold may alternatively be set by predetermined grid requirements, or may be adaptive based upon monitored parameters of the plant or grid.

The first and second time periods may be concurrent and of equal length. Thus, the comparison of voltage levels against the first and second thresholds may be performed at the same time.

The at least one test may comprise comparing the voltage level with a third voltage threshold and performing a count of the number of times that the voltage level is equal to the third voltage threshold within a third predetermined time period. The test may be passed if the count is zero or an even number. The test may be passed if the voltage level is greater than the third voltage threshold at the end of the predetermined time period.

Counting the times that the third threshold is crossed provides an indication of stability of the voltage levels following the initial recovery. An unstable, and therefore weak, recovery, may have an odd count, where the voltage level is below the third threshold at the end of the third time period. This may indicate that the recovery has decayed below the level that it should be, and advantageously permits protection of the generators where instability is present.

The second and third voltage threshold may be the same. The third time period may follow at least one of the first time period or the second time period. Comparing the voltage level with a third voltage threshold may be performed after the comparison of the voltage level with the first or the second threshold. The comparison of the voltage level with the third voltage threshold may be performed only if the previous two comparison tests are passed.

The method may further comprise determining that the voltage deviation fulfils low-voltage criteria. The method may further comprise entering a low-voltage mode if the low-voltage criteria are fulfilled, the low-voltage mode being configured to run concurrently with the recurring fault mode. Running concurrent low-voltage and recurring fault modes provides an extra layer of protection, and uses the existing protocol to help protect generators during recurring fault situations.

If the voltage recovery is categorised as weak recovery, the step of implementing a ride-through protocol may comprise terminating the recurring-fault mode and operating the wind turbine generator in low-voltage mode only. The method therefore protects the generators first and foremost, where a weak recovery exists.

If the voltage recovery is categorised as strong recovery, the step of implementing a ride-through protocol may comprise altering the low-voltage mode to account for a subsequent voltage dip. Alteration of a low-voltage mode may be a particularly useful feature as it allows for restriction of the low-voltage mode's operation. Disconnection of the generators from the grid due to the low-voltage mode's operation during recurring faults can be halted.

Altering the low-voltage mode may comprise restarting the low-voltage mode before automatic reclosure to prevent the wind turbine generator from being disconnected in the event of another voltage deviation.

Where the voltage recovery is strong, by altering the low-voltage mode in the above way, the method beneficially identifies that the generator is unlikely to be in danger in the low-voltage mode and so acts to ensure that disconnection does not occur should a further voltage deviation happen. This procedure improves the likelihood that generator is maintained in compliance with grid requirements.

The method may comprise identifying a further voltage deviation and operating the wind turbine generator in recurring fault mode in relation to the further voltage deviation. In this way, the method is useful in protecting generators throughout the entirety of the recurring fault, not just the first deviations.

The method may comprise terminating recurring fault mode if the voltage levels return to normal operational levels.

According to another aspect of the invention, there is provided a wind turbine generator may comprise a wind turbine controller configured to carry out the method described above.

According to another aspect of the invention, there is provided a computer program product downloadable from a communication network and/or stored on a machine readable medium, comprising program code instructions for implementing the method described above.

Within the scope of this application it is expressly intended that the various aspects, embodiments, examples and alternatives set out in the preceding paragraphs, and/or in the following description and drawings, and in particular the individual features thereof, may be taken independently or in any combination.

BRIEF DESCRIPTION OF THE DRAWINGS

One or more embodiments of the invention will now be described, by way of example only, with reference to the accompanying drawings, in which:

FIG. 6a is a chart showing strong voltage recovery of a wind turbine generator;

FIG. 6b is a chart showing the resetting of the low-voltage ride-through protocol in response to the recovery show in FIG. 6a;

DETAILED DESCRIPTION

Figure 1:
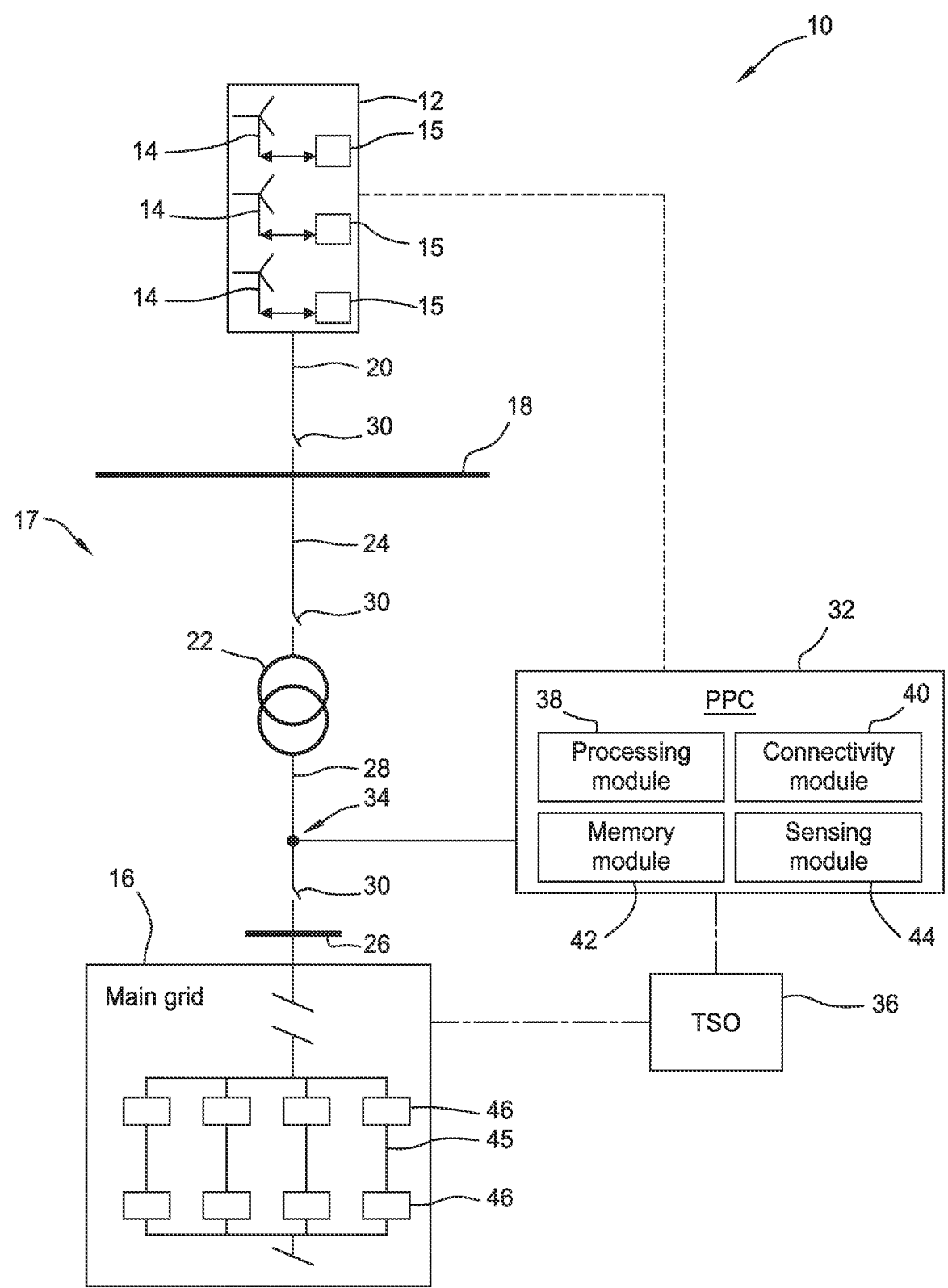
FIG. 1 is a schematic view of a wind power plant and its connection to a grid.

FIG. 1 illustrates a typical architecture in which a wind power plant (WPP) is connected to a main transmission grid as part of a wider power network. As will be understood by the skilled reader, a WPP comprises at least one wind turbine generator (WTG), and is also known as a wind park or a wind farm. The example shown is representative only and the skilled reader will appreciate that other specific architectures are possible, in relation to both wind power plants and power plants for other renewable energy sources. Thus, the invention also relates to renewable energy power plants in general, rather than being specific to wind power plants as in the illustrated embodiment. In addition, the skilled reader will appreciate that methods, systems and techniques also described below may be applicable to many different configurations of power network. Moreover, the components of the wind power plant and power network are conventional and as such would be familiar to the skilled reader.

FIG. 1 shows a power network 10 incorporating a WPP 12. The WPP 12 includes a plurality of WTGs 14. A single WTG would also be possible. Each of the plurality of WTGs 14 converts wind energy into electrical energy, which is transferred from the WTGs 14 to a main transmission network or main grid 16, as active current, for distribution. A collector network 17 extends between the WPP 12 and the main grid 16.

Each of the WTGs 14 is associated with a respective WTG controller 15. In some embodiments, a set of WTGs may share a single, semi-centralised WTG controller, such that there are fewer WTG controllers than WTGs. WTG controllers 15 can be considered to be computer systems capable of operating a WTG 14 in the manner prescribed herein.

During normal operation of the WPP 12, the WTG controllers 15 operate to implement active and reactive current requests received from a power plant controller (PPC) 32. During extraordinary conditions, such as during a grid fault, the WTG controllers 15 operate to fulfil predetermined network requirements, as well as acting to protect the WTGs 14 from any potentially harmful conditions.

WTGs 14 generate both active current and reactive current, and are operated to support the voltage level of the main grid 16. The main grid 16 often has specific requirements for voltage support, especially during deviations of the voltage from conventional operating conditions, with which the WPP 12 is required to comply. The WPP 12 will be expected to stay connected to the grid 16 throughout a variety of faults or voltage deviations, including during recurring faults.

Recurring faults are faults where the voltage level 'dips', or drops below a certain threshold value, more than once without returning to normal operational levels. Initially, a fault may occur where the voltage level decreases rapidly from normal operational levels. Often, voltage levels recover to close to conventional levels. However, in some circumstances, recurring faults occur where the voltage levels do not completely recover to pre-fault levels, and instead a second dip occurs, where the voltage drops rapidly again after recovering partially. A recurring fault may have any number of dips before recovery. Recurring faults may also be defined by way of time periods, such as where a second voltage dip occurs within a predefined time period after the first fault. Such time periods may be quantifiable using knowledge of the operation of systems within the grid. By way of example, the predefined time period may be one second, but this should be understood as not to be limiting.

More particularly, recurring faults occur when a short-circuit is not cleared in time to prevent multiple voltage dips occurring on the grid, due to the automatic operation of protection systems within the power plant or grid. Conventional protection systems may inadvertently disconnect the WPP 12 from the grid 16 during multiple voltage dips and recurring faults, and their adaptation to account for multiple dips can lead to inefficient protection of the WPP 12 during other faults. WPPs 12 having WTGs 14 that are operated according to the method of the present invention are configured to account for recurring faults by resetting conventional protection systems prior to the next dip, provided the condition of the grid 16 is good enough to support strong voltage recovery.

Returning to FIG. 1, each of the WTGs 14 of the WPP 12 is connected to a local grid (not shown) that links the WTGs 14. The WPP 12 is, in turn, suitably connected to a collector bus 18 via a feeder line 20. The collector bus 18 may be at an intermediate voltage level that is suitable for relatively short distance power transmission, for example in the region of 10 kV to 150 kV, most usually between 110 kV and 150 kV. The collector bus 18 may also provide a point of common coupling (PCC) for a plurality of wind power plants, although, only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

The connecting lines such as the transmission and feeder lines 20, 24, 28 may each include a protection system 30 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A Power Plant Controller (PPC) 32 is connected to the power network 10 at a Point of Measurement (PoM) 34 and is also connected directly to the WPP 12. The role of the PPC 32 is to act as a command and control interface between the WPP 12 and a grid operator or transmission system operator (TSO) 36. The TSO 36 is responsible for indicating the needs and requirements of the main grid 16 to the PPC 32. The PPC 32, in its role as command and control interface, interprets the power delivery demands requested of it by the TSO 36 and manages the WTGs 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive current exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive current output in reaction to commands received from the PPC 32.

The PPC 32 communicates control commands to the WTG controllers 15, or directly to the WTGs 14, in a suitable manner. It will be noted that FIG. 1 is a schematic view, so the way in which the control commands are transferred is not depicted explicitly. However, it will be appreciated that suitable cabling may be provided to interconnect the PPC 32 and the WTGs 14 or WTG controllers 15. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The main grid 16 incorporates, among other components, transmission lines 45 for transmission of power supplied by the WPP 12 and other connected power plants to end users (not shown). For safety, the main grid 16 also incorporates protection means, in the form of a plurality of automatically reclosing circuit breakers 46, at intervals along each transmission line 45. These line breakers 46, which are also known as 'reclosers' operate to prevent damage to the system 10 if an event occurs that leads to a sudden and unexpected voltage change, such as a short circuit. This protection is achieved by opening the line breakers 46 to isolate the section of the transmission lines 45 where the short circuit has occurred. The line breakers 46 automatically reclose the isolated line 45 after a predetermined time period has elapsed following the opening of the line breakers 46 so as to bring the line 45 back online following the fault as quickly as possible.

The diagram of FIG. 1 should only be taken as a representation of a power network. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of turbines included in the plurality of wind turbines.

As discussed in relation to FIG. 1, the main grid 16 incorporates a plurality of line breakers 46 which operate to isolate sections of the transmission line 45 if a fault event, for example a short circuit, occurs on that section of the line 45. Line breakers 46 or other circuit breakers may also be used for performing maintenance on that line section. Short circuits result in dips in the voltage levels of the grid 16, and these dips are also reflected in the voltage level at the PoI 26 between the grid 16 and the WPP 14. Once the line breakers 46 have isolated the short circuiting section of the transmission lines 45 from the rest of the grid 16, the voltage levels can recover.

As events that result in short circuits are usually temporary, or only semi-permanent at the very least, the event may quickly clear itself, allowing the transmission line 45 to be brought back 'online' following the outage by re-closing the line breakers 46 to reconnect the isolated, disconnected section of line 45 to the rest of the grid 16. Line breakers 46 automatically reclose after a predetermined time period has elapsed following an outage so that the line can be offline for as short a time as possible. If the event has cleared, then the voltage of the grid 16 can be brought back to ordinary levels. Typically, the time period is around 1.5 seconds which is specified by a grid operating system.

However, if the event has not cleared, then the reclosing of the affected section of transmission line 45 by the line breakers 46 will simply reconnect the short circuit to the grid 16, causing another dip in voltage levels. The line breakers 46 then open again, and attempts to reclose again once the time period has elapsed. This leads to multiple voltage dips, or what is known as a 'recurring fault', and is seen across the network.

For example, a short circuit may be caused by a stray tree branch briefly touching a transmission line. As the tree moves away from the line, the problem will be removed, the line will be clear to be brought back online, and so automatic reclosing will be successful. If the tree branch remains in contact with the transmission line, reclosure of the affected section of the line by the line breakers will only result in another voltage dip. Multiple voltage dips will occur until the problem has been resolved, and the fault has cleared.

To deal with recurring faults, power network interconnection requirements, or grid codes, have specific criteria that connected WPPs 12 should meet in order to be compliant. Non-compliance may lead to penalties being imposed on power plant operators, especially for operators of existing power plants. Compliance is mandatory for new power plants. An example of these criteria is shown in the % voltage-time chart of FIG. 2, which illustrates the requirements for generating units, i.e. WTGs 14, during automatic reclosure of a transmission line 45. The WTG controllers 15 and/or PPC 32 are expected to operate the WTGs 14 to comply with these criteria during recurring faults.

Figure 2:
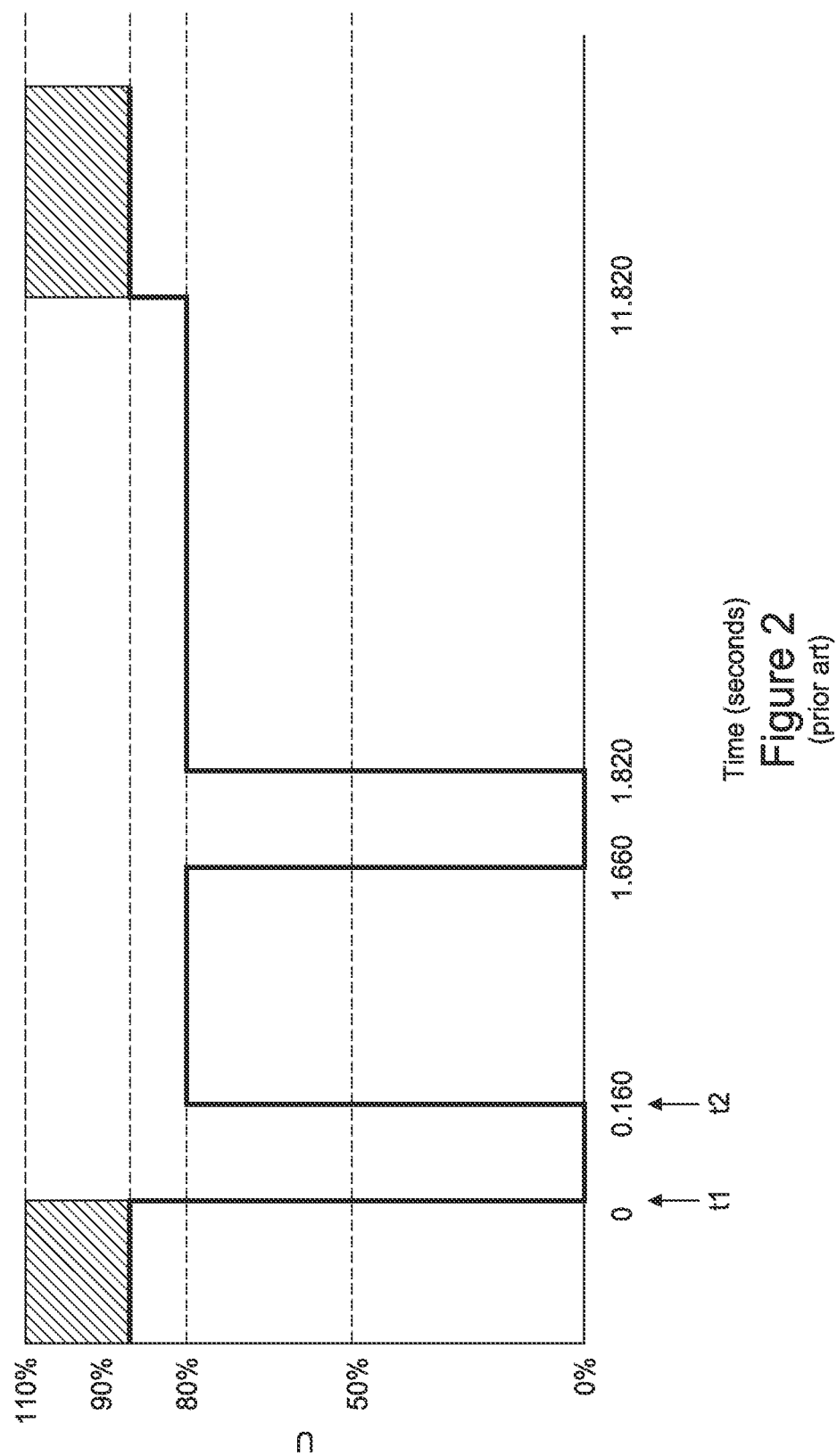
FIG. 2 is a chart showing a typical reclosing sequence during a recurring fault on a power network.

In FIG. 2, a short circuit event occurs at 0 seconds, which may also be referred to as 't1'. Prior to this event, the WTG 14 is assumed to be operating in its normal operational range of between 90% and 110% of expected voltage, which may also be written as between 0.9 and 1.1 per-unit voltage (pu).

As would be understood by the skilled person, per-unit voltage is an expression of the voltage with respect to a base value which is used as a reference. Using a per-unit system allows for normalization of values across transformers and other components that may change the value by an order of magnitude.

At 0 seconds, the short circuit occurs, and the voltage level of the grid 16 drops to 0%, or 0 pu, voltage. Similarly, the voltage level of the WTGs 14 will also drop. After 0.16 seconds, or 't2', the line breakers 46 act to isolate the short circuit, and open, after which each WTG 14 is expected to recover back to its pre-fault voltage level at its terminal. As will be understood by the skilled person, the terminal of the WTG is the point of connection of that WTG 14 to its local grid (not shown).

The line breakers 46 are configured to automatically reclose an affected line 45 once a time period of 1.5 seconds has elapsed after they opened, i.e. 1.5 seconds after t2. As the fault has not yet self-cleared, a second voltage dip occurs 1.66 seconds after the short circuit first occurred. The line breakers 46 respond to re-isolate the affected line 45 0.16 seconds later, and re-open.

In the example of FIG. 2, it is assumed that the fault clears after the second dip, and so when the line breakers 46 act to reclose the line 45 at a time of 1.5 seconds after opening for the second time, at 3.32 seconds, there is not another dip. Instead, it is expected that the WTG 14 will continue to supply active power, maintaining the 80% voltage level at least, before returning to ordinary operation between 90% and 110% voltage level 10 seconds later at 11.82 seconds.

It will be appreciated that the times shown in FIG. 2 are used as examples only. Other values may be used as appropriate. The durations after which openings or reclosures of the line occur are specific to each main grid 16.

Figure 3:
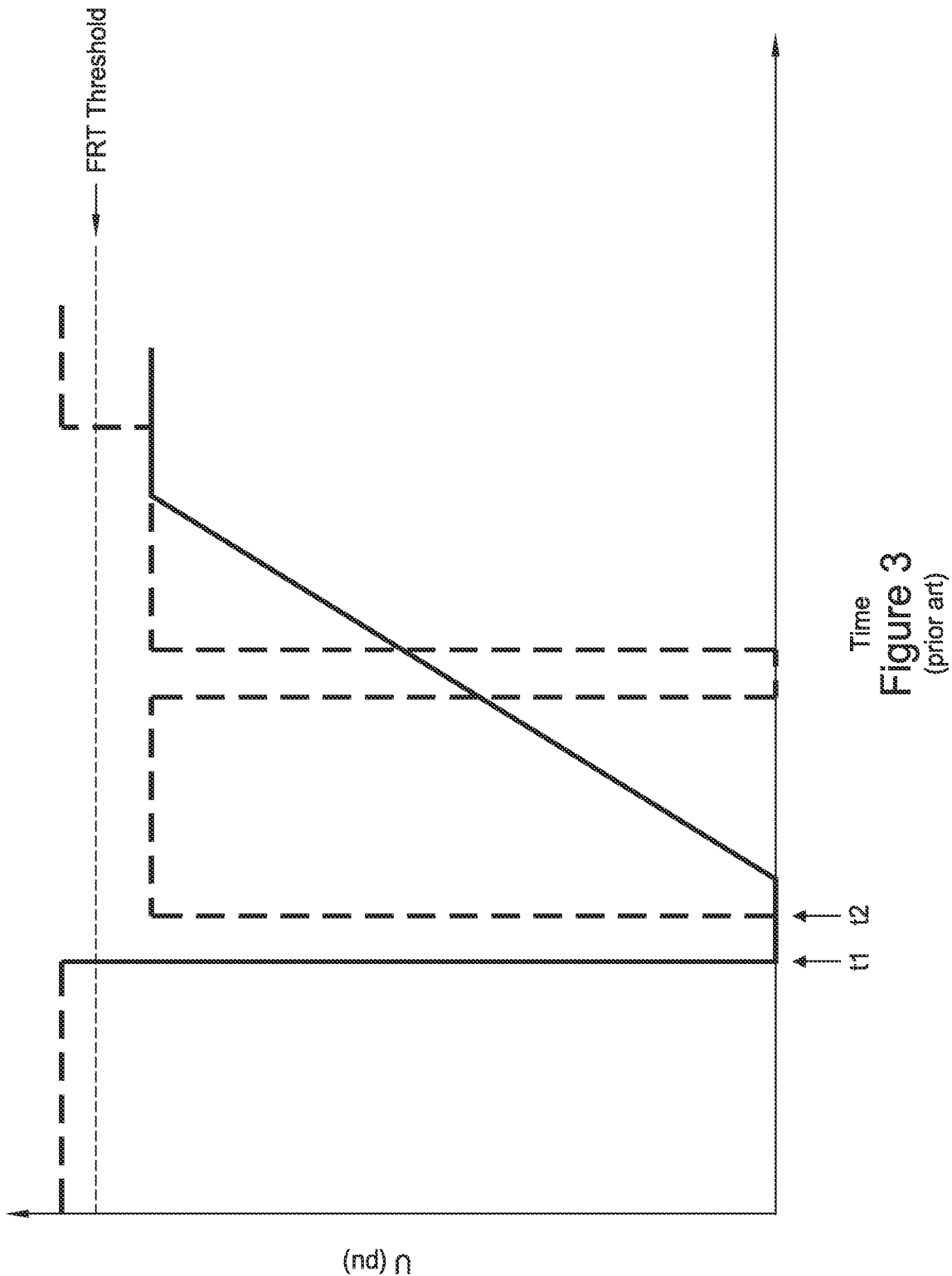
FIG. 3 is a chart showing voltage recovery of a wind turbine generator using conventional protection methodology.

FIG. 3 shows a similar chart to that of FIG. 2 overlaid with an example of a conventional low-voltage ride-through (LVRT) protection scheme curve. The curve dictates the terminal voltage level above which a WTG 14 should be kept connected to the grid 16 or its local grid (not shown) by the WTG controller 15 or PPC 32. If the voltage level falls below the curve, the WTG 14 should 'trip' and be disconnected, in order to protect the WTG 14 from sustained low voltage conditions.

Initially the LVRT curve tracks the fault and, a short period after the opening of the line, increases linearly from 0 pu to 0.8 pu over a predefined time period. The relatively slow and slightly delayed rise of the curve means that the conditions for disconnection of the WTG 14 typically have to constitute a major fault resulting in sustained low voltages. Once the terminal voltage has reached a predefined exit threshold, which is slightly below 0.9 pu in this example, the LVRT curve is no longer required and so effectively 'resets' in preparation for a subsequent fault.

Ordinarily, when only a single dip results from a fault, the terminal voltage of the WTG 14 would be expected to rise above 0.8 pu well before the LVRT curve, meaning that the WTG 14 stays connected to the grid as required. It would be expected that the terminal voltage would then rise to the exit threshold value to 'reset' the LVRT curve.

In contrast, in multiple dip scenarios, even though the WTG 14 should stay connected to the grid, the presence of a second or later dip will result in a voltage drop that is below the LVRT curve, and so disconnection of the WTG 14 will result.

In some situations, in order to deal with multiple dips, LVRT curve exit thresholds have been lowered to unusually low levels so that the LVRT curve resets prior to the second dip. However, this too may result in exposure of the WTG 14 to damage as the exit threshold should be set close to normal operating condition. Interference with under-voltage protection schemes is also likely in this situation.

Therefore, the present invention presents a solution to the problem of how best to account for multiple voltage dips. The present invention utilises a protection scheme that is operable in addition to the LVRT protection scheme and that integrates with the LVRT protection scheme to provide adequate protection for WTGs during recurring fault scenarios. In particular, the present invention utilises the recovery of voltage as an input to a control method to satisfactorily predict, in real time and in the period between dips, whether it will be necessary to reset the LVRT curve in preparation for a second or subsequent dip, as well as predicting whether resetting the curve is likely to endanger the WTG.

Figure 4:
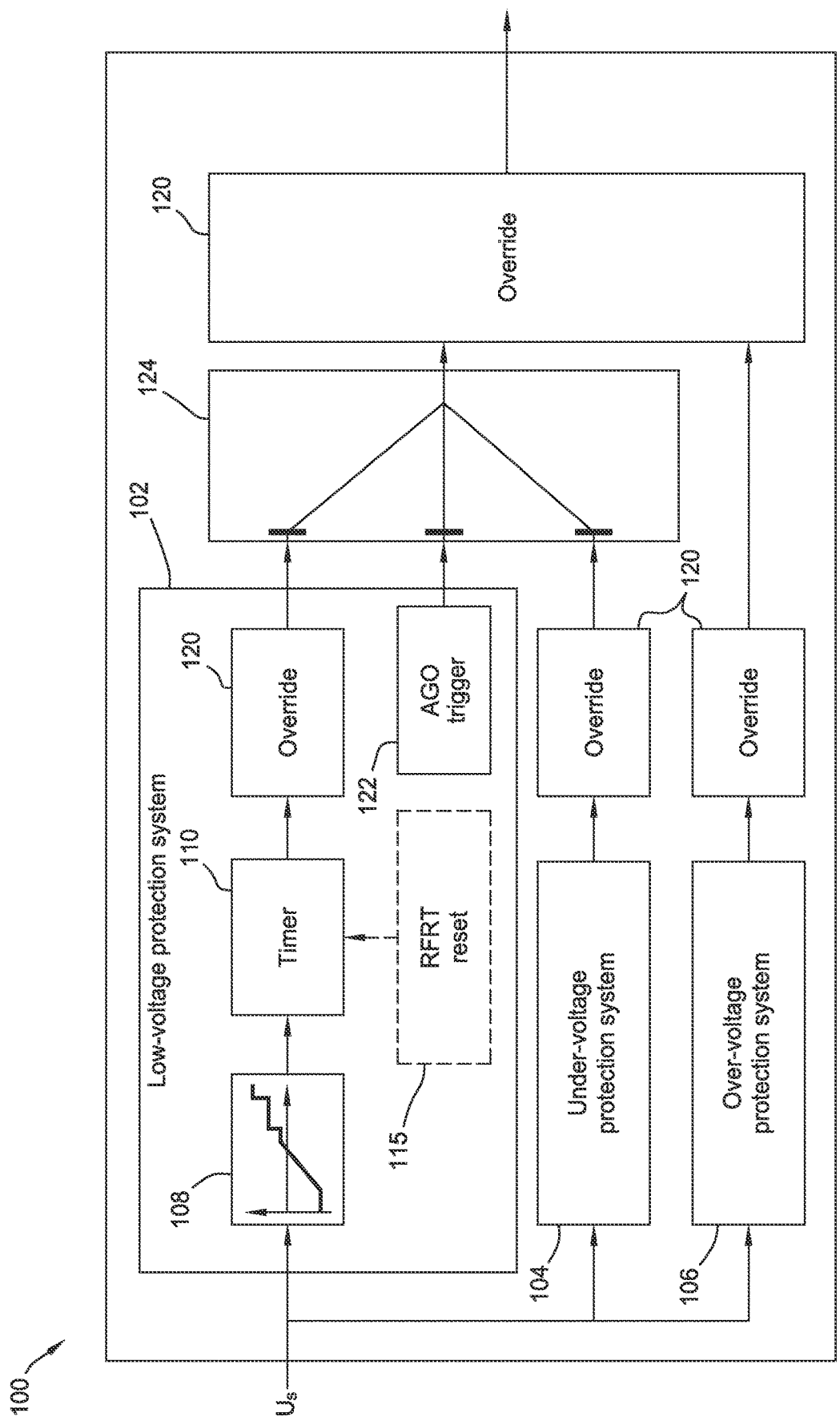
FIG. 4 is a block diagram of a control method according to an embodiment of the invention.

A representation of the incorporation of the present invention into an existing WTG protection scheme 100 is shown in FIG. 4. In FIG. 4, an input voltage, $U_s$, is queried by a low-voltage protection scheme 102, an under-voltage protection scheme 104 and an over-voltage protection scheme 106. The low-voltage protection scheme 102, which incorporates the LVRT curve 108 and a timer 110, now includes a 'recurring fault ride-through' (RFRT) reset protection module 115, operating according to a RFRT reset method 200, in communication with the timer 110. Any of the low-voltage, under-voltage, or over-voltage protection systems 102, 104, 106 may output a trip signal, based upon the input voltage, $U_S$.

It can be seen, therefore, that the present invention does not interrupt the operation of any of the protection schemes 102, 104, 106 but instead supplements the LVRT protection 102 by providing a new, extra level of scrutiny to the terminal voltage, $U_s$, seen by the WTG 14. Note that the under-voltage protection scheme 104 and the overvoltage protection scheme 106 are not the focus of the inventive concept described herein, but are included in this discussion in overview for context and completeness. Similarly, the override modules 120, AGO trigger 122, and switch 124 for selecting low-voltage, under-voltage, or AGO are provided for context only.

Therefore, it will be appreciated that the RFRT reset protection module 115 provides functionality that is in addition to and complements existing protection functionality that may be provided in a WTG or power plant controller.

The RFRT reset method 200, according to which the module 115 and low-voltage protection system 102 operate, is implemented within a WTG 14 or PPC 32 as a mode of operation, which may be referred to as RFRT mode, or more simply, 'recurring fault mode'. Recurring fault mode is entered if a voltage deviation or excursion from normal operational voltage levels of the main grid 16 is identified, and if it is determined that the deviation fulfils criteria for automatic reclosure of a transmission line 45 to occur. If a deviation fulfilling the criteria is determined, the mode is entered and the recovery of voltage is monitored, categorised into a category according to predetermined measures, and the correct response is implemented. The correct response is in the form of a ride-through protocol.

In other words, the mode and method 200 is implemented to operate a WTG 14 to account for recurring faults caused by automatic reclosure, and the recurring fault mode serves the purpose of balancing a compromise between allowing for a recurring fault and protecting WTGs from inadequate grid conditions. If, having identified a deviation of voltage levels and determined that recurring faults are possible, the grid condition is sufficient to ensure safety of the WTG, then recurring faults are catered for. However, the safety of the WTG takes precedence over accounting for recurring faults, so unstable grid conditions are countered with the established LVRT protection scheme.

For sufficient protection, the voltage level attained following the dip, the speed at which that voltage level was attained, and the stability of the voltage level at the terminal should all be considered before a ride-through protocol is decided upon. These 'tests' may form the basis for the categorisation.

The recurring fault mode is preferably carried out for each individual WTG at respective WTG controllers, although it is possible that the method may also be performed by the PPC, by an intermediate controller, or by a remote controller.

An example of a method that can be used to categorise the recovery of voltage levels following a fault as described above is shown in FIG. 5. The method 200 of FIG. 5 categorises voltage recovery into one of two categories: 'weak recovery' or 'strong recovery'. Weak voltage recovery indicates that the recovery of the voltage is insufficient and potentially volatile, and that such instability may cause damage to the WTG 14. During weak recovery, therefore, the WTG 14 is controlled according to the conventional LVRT protection scheme. Strong recovery indicates that the recovery of the voltage is stable and sufficient to permit resetting of the LVRT protection scheme to account for recurring faults.

Figure 5:
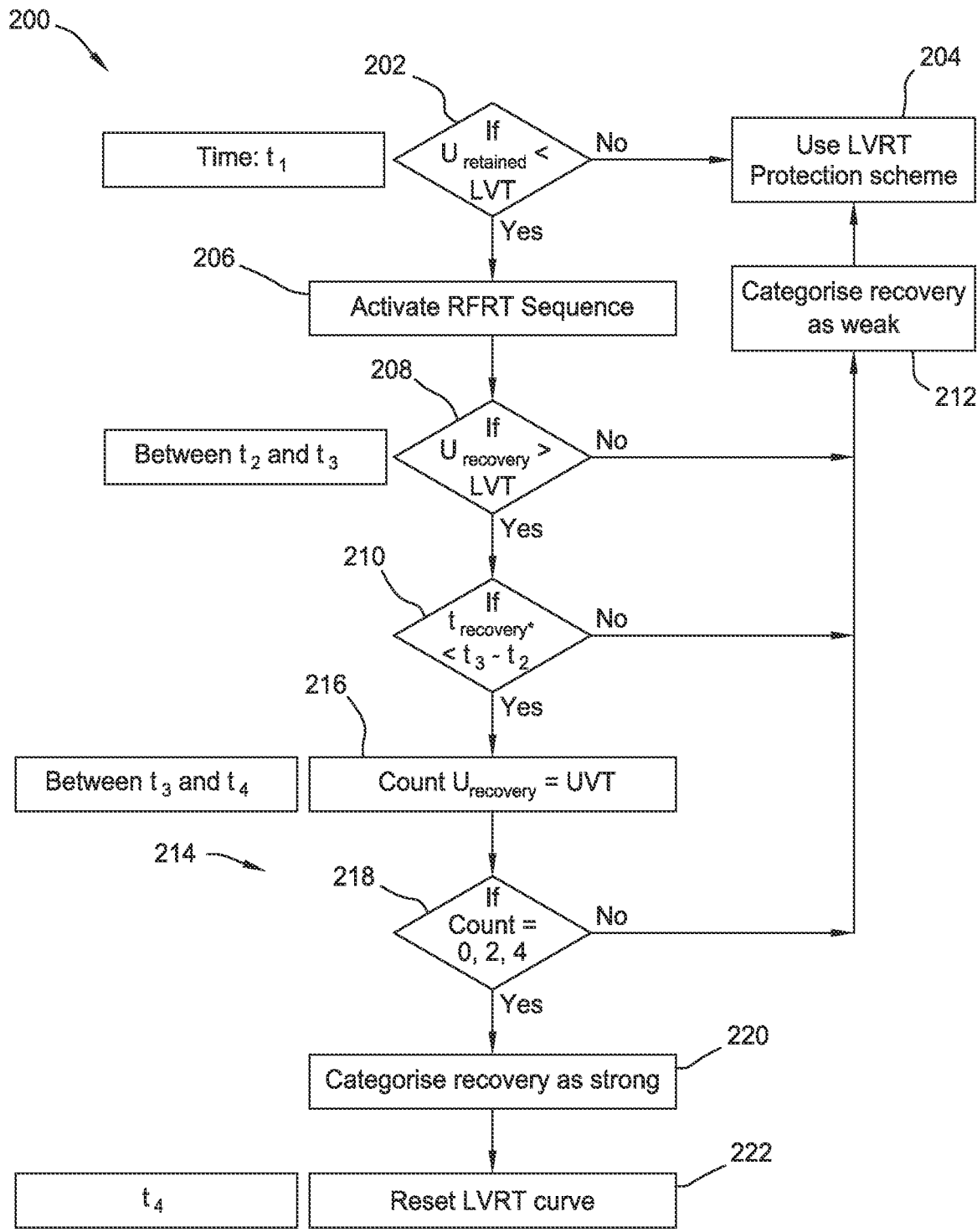
FIG. 5 is a flow chart illustrating the control method of FIG. 4.

The method 200 of FIG. 5 is begun if it is identified that a deviation of voltage level from normal operational voltages has occurred, and this step may also form the initial step of the method, despite not being shown here. Once the method 200 has been begun, it is determined 202 whether the deviation fulfils the criteria for automatic reclosure by comparing the level to which the voltage has dipped, $U_{retained}$, at time t1, to a lower voltage threshold, LVT. The LVT is a predetermined level set by operators of the main grid 16, and is the level that voltage must dip below for automatic reclosure to be implemented. The LVT may also by altered by the grid operator based on the condition of the grid. Any changes to this value will be communicated to the PPC 32 and the WTG controllers 15 by the TSO 36.

If, in this step 202, it is determined that the LVT is not crossed by the voltage level, then ordinary LVRT procedures are followed 204. The threshold for LVRT protection schemes to be implemented is assumed to be higher than the LVT.

If it is determined by this step 202 that $U_{retained}$ is less than LVT, the recurring fault ride-through (RFRT) sequence, or recurring fault mode, is implemented 206, and the WTG 14 is operated according to it. The recurring fault mode and LVRT protection schemes operate in tandem, and the recurring fault mode can be considered to augment the LVRT protection scheme. The recurring fault mode may be terminated at any point based upon the method 200.

Having activated 206 the recurring fault mode, the first test, also first analysis 208, of the recovery is performed 208 between time t2 and time t3. Time t2 is the point at which the affected transmission line 45 is isolated by opening the line breakers 46, and so will be a known variable for the WTG controllers 15. Time t2 is typically calculated relative to time t1 and is set by the grid operator according to grid conditions. Time t3 is also a fixed time period and is set relative to t1. Time t3 is determined for the WTG 14, WPP 12 or grid 16 as required, and is variable such that it can be altered based on the conditions of the system 10 and requirements of the operator as will be discussed later.

Returning to the first analysis 208 of the method 200, the recovery voltage, $U_{recovery}$, is compared with the LVT to identify whether the voltage level has returned above this threshold following the dip within the time period between t2 and t3. $U_{recovery}$ is the actual measured voltage level that is achieved following the removal of the first dip, after t2. If the recovery voltage is above the low voltage threshold at any point between t2 and t3, then the second analysis 210 is performed. If, for the entire time between t2 and t3, the voltage does not achieve a level above LVT, then the voltage recovery is categorised 212 as weak, the recurring fault mode is terminated, and the conventional LVRT scheme is followed 204.

The second test, also second analysis 210, is performed upon identification that the recovery voltage was above the low voltage threshold within the time period between t2 and t3, i.e. between the opening of the line on which the fault is identified and the time period set by the system for the purpose of categorisation of the recovery. The second analysis 210 identifies when the recovery voltage first crosses an upper voltage threshold (UVT). The UVT is a predetermined threshold that is greater than the LVT but lower than the exit threshold for the LVRT scheme. The UVT can be set according to grid conditions or according to the WPP operation or interconnection. The UVT may be specified by the TSO 36 or by the WPP operator.

The time measured from t2 to the first crossing of the UVT is labelled $t_{recovery*}$. If $t_{recovery*}$ is less than t3-t2, then the third analysis or test 214 is performed. If $t_{recovery*}$ is greater than t3-t2, then the voltage recovery is categorised 212 as weak, the recurring fault mode is terminated, and the conventional LVRT scheme is followed 204. Therefore, this second analysis 210 deals with the speed of the recovery.

If the first two analyses 208, 210 have identified that the voltage recovery is not weak, then the third analysis 214 is performed. The third analysis 214 identifies the stability of the voltage recovery at the UVT. By considering the oscillatory movement of the voltage level about the UVT, the stability of the recovery can be monitored and determined prior to the reclosure of the line by the line breakers 46.

The third analysis 214 comprises counting 216 the crossings of the UVT by the recovery voltage in the time period between time t3 and time t4. Put another way, this means that every time $U_{recovery}$=UVT, the count increases, provided those crossings are between t3 and t4. Time t4 is a time calculated to be fractionally before the reclosure of the line 45 by the line breakers 46. As the time of the reclosure is known relative to t2 and t1, t4 can be set to be just before this reclosure.

As prior to the third analysis 214 the voltage level has exceeded UVT, a subsequent crossing will bring the voltage level below the UVT. Similarly, all odd number of crossings according to the count of the third analysis 214 at this step will be a dip in the voltage, while even numbered crossings will indicate the voltage level rising about the UVT. Therefore the third analysis 214 also comprises the step 218 of identifying if the count is an even integer. If the count is not even, then the voltage level will be below the UVT prior to the next voltage dip, and the voltage recovery is categorised 212 as weak. If the count is 0 or even, then the voltage recovery is above the UVT immediately before the next dip, and the voltage recovery can be categorised 220 as strong recovery. As the voltage recovery is strong, then recurring faults can be accommodated, and so the LVRT curve is reset 222 at t4 so that the next dip does not disconnect the WTG.

Thus, more generally, the recurring fault mode may be considered to carry out monitoring of the recovery, categorisation of the recovery into a category such as strong recovery or weak recovery, and implementing an operation of the WTG 15 according to ride-through protocol. It should be noted that although only strong and weak recovery are discussed here, it may be useful to incorporate more categories to permit different actions to be taken based upon the conditions of the system.

Figure 7:
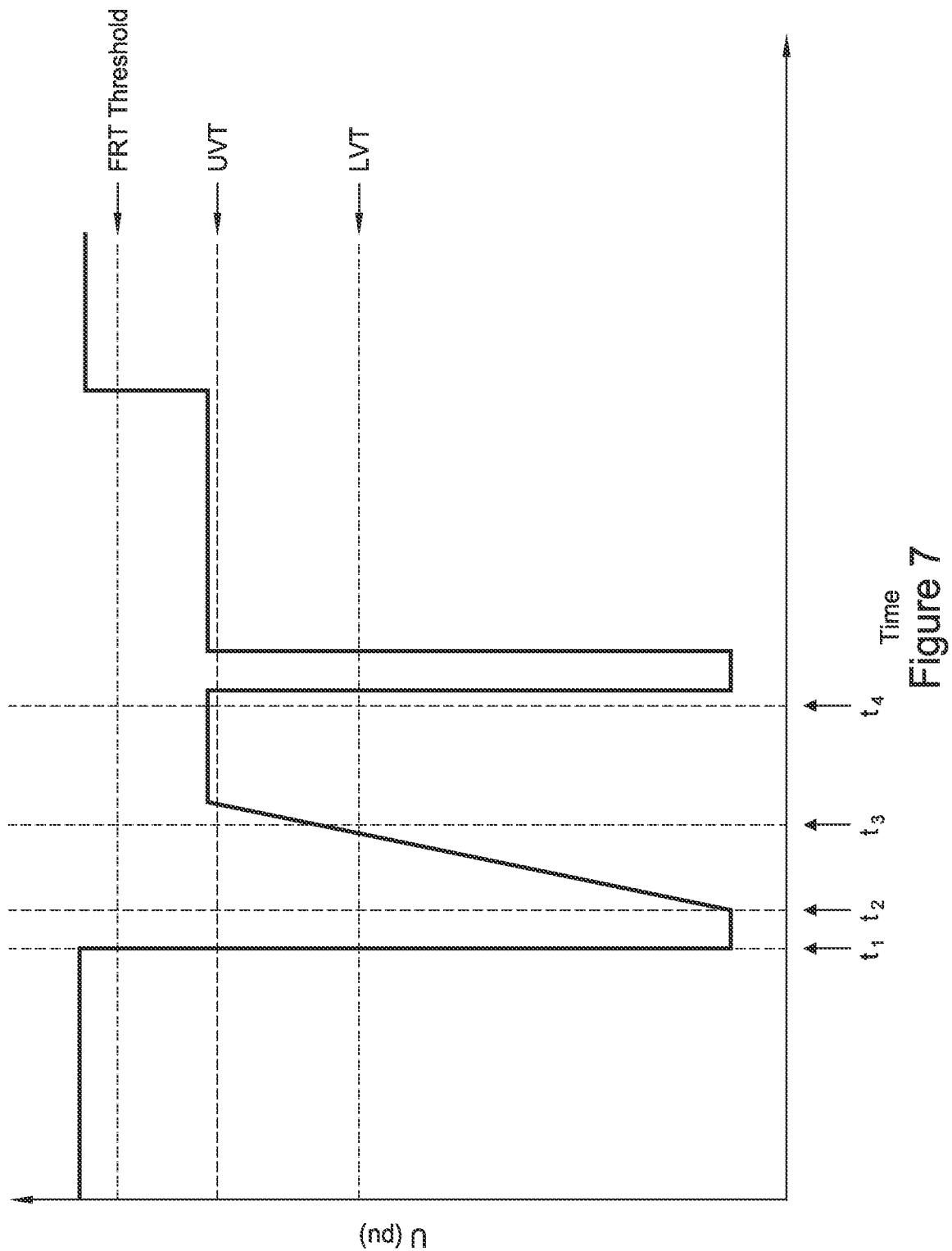
FIG. 7 is a chart showing weak voltage recovery of a wind turbine generator.
Figure 8:
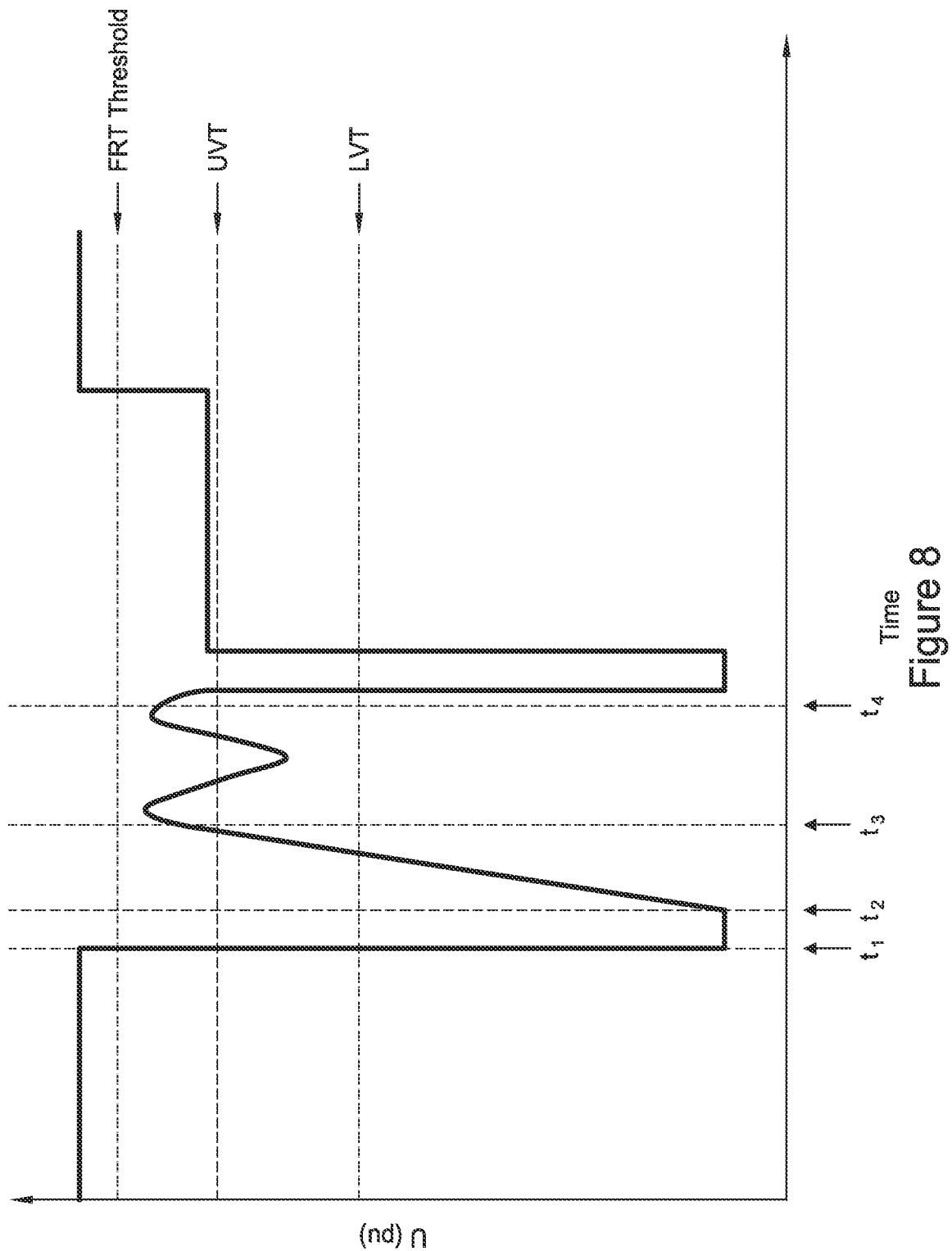
FIG. 8 is a chart showing an alternative strong voltage recovery of a wind turbine generator.
Figure 9:
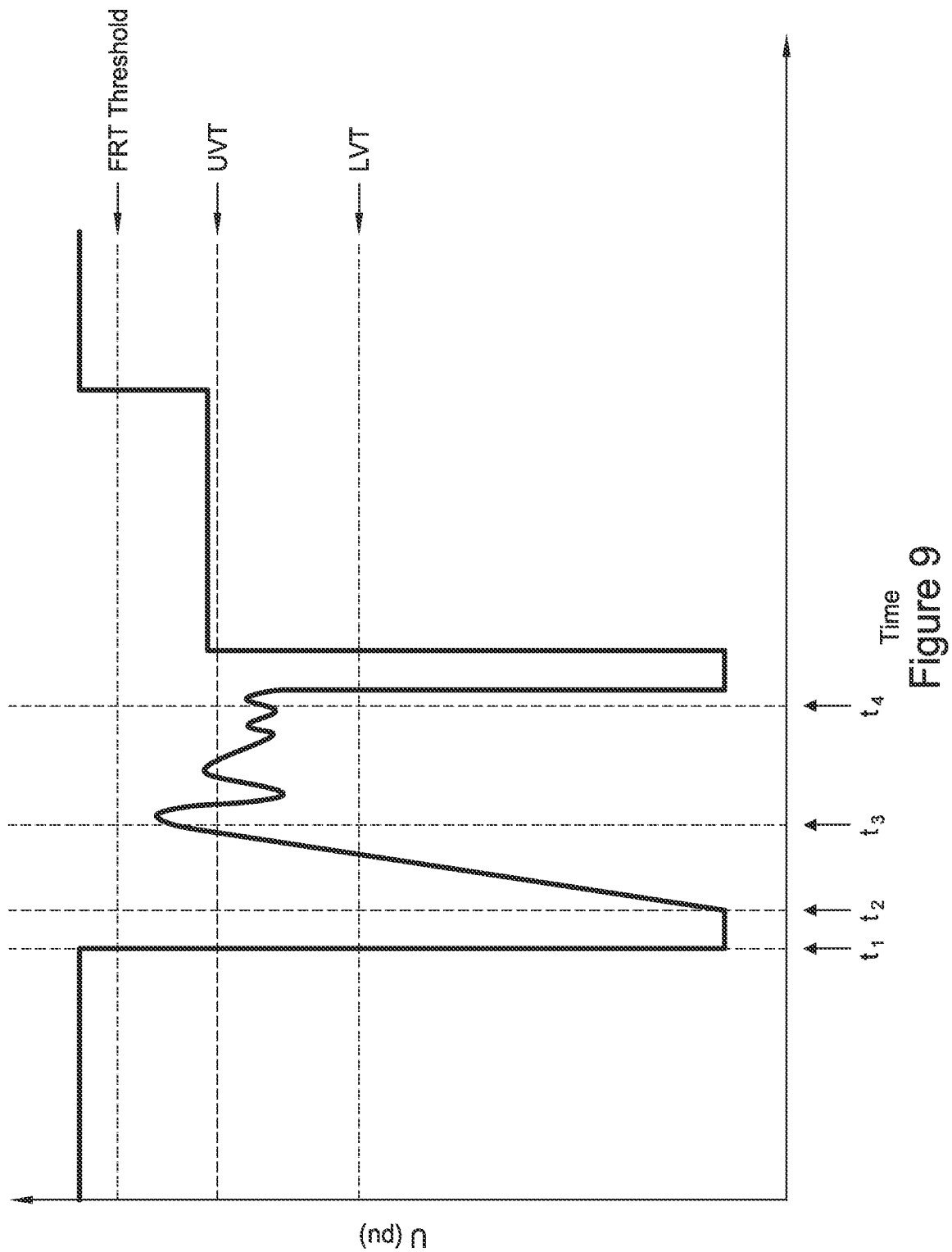
FIG. 9 is a chart showing an alternative weak voltage recovery of a wind turbine generator.

Examples of different recoveries are shown in FIGS. 6 to 9. FIGS. 6 and 8 show different scenarios in which voltage recoveries might be categorised as strong, while FIGS. 7 and 9 show scenarios in which voltage recoveries might be categorised as weak.

In each of FIGS. 6 to 9, a fault occurs at t1, and the voltage deviation from operating voltage is sufficient to fulfil the criteria set out in the first step 202 of the method 200 of FIG. 5. That is to say, that in each of FIGS. 6 to 9, the recurring fault mode is activated 206 and followed according to the steps of FIG. 5.

Furthermore, in each of FIGS. 6a to 9, it is assumed that the line breakers 46 are opened at t2 and result in a voltage recovery as the short circuit is isolated. It is also assumed that reclosure happens very shortly after t4. Finally, these Figures are only concerned with the recovery following the first dip, and so the recovery of the second dip is shown as being the ideal case, in which the voltage level returns to a level above UVT instantaneously and remains at this level for a while before returning to pre-fault levels after a set time period. It will be appreciated that multiple dips may occur if the fault is not cleared following the second dip, and so the method 200 of FIG. 5 may be repeated as many times as necessary.

Focussing initially on FIG. 6a, with reference to FIG. 5, the voltage deviation occurs at t1, recurring fault mode is activated 206, and the line breakers 46 are opened at t2 as discussed above. A voltage recovery is shown between t2 and t3. The voltage recovery crosses the LVT, and so passes the first test 208 of FIG. 5. UVT is also crossed by the voltage recovery, and this is crossed before t3, meaning that the second test 210 of the recurring fault mode of FIG. 5 is passed. Finally, the same voltage level is maintained above UVT until t4, and so the count for recovery voltage being UVT is 0. The final test 214 is therefore passed, and the recovery can be categorised 220 as strong. In this case, the LVRT curve is reset 222 at t4, although this is not shown in FIG. 6a. The WTG 14 will stay connected through the second dip.

FIG. 6b shows the effect of resetting the LVRT curve. In FIG. 6b, the voltage levels of FIG. 6a are shown by the dashed line, while the LVRT curve is shown in the solid line. It can be seen that at or between t4 and the second dip, the LVRT curve is reset to its lowest point, and the count before the slow ramp up of the LVRT curve is restarted.

Also shown in FIG. 6a, and in FIG. 7, is a shaded area between t2 and t3. This shaded area indicates the region through which an initial recovery should pass in order to be considered strong. If the recovery does not lie in this region, the recovery is automatically considered weak, regardless of the later recovery.

In FIG. 7, the voltage deviation occurs at t1, and the line breakers 46 are opened at t2. The recovery reaches the LVT, and so the first test 210 is passed. However, UVT is reached after t3, so the recovery time is greater than t3-t2. The second test 212 is not passed, and the recovery is categorised 212 as weak. It can be seen that the weak initial recovery falls outside the shaded area. Therefore, the LVRT curve is not reset prior to the second dip in this scenario, and the second dip will result in the LVRT curve tripping and disconnection of the WTG 14.

FIG. 8 shows a strong recovery, where oscillations occur following the initial recovery above UVT. It can be seen that the recovery of the voltage level between t2 and t3 passes the first and second tests 208, 210 of the recurring fault mode, and that between t3 and t4, the voltage level is equal to UVT at two times, once when descending below UVT and once when returning above UVT. Therefore, as the count of UVT=$U_{recovery}$ is 2, the recovery is categorised 220 as strong. The LVRT is reset 222 at t4, prior to the second dip. The WTG 14 will stay connected through the second dip.

Finally, FIG. 9 shows an initial strong recovery, which subsequently turns weak between t3 and t4. As can be seen, the initial recovery falls within the shaded portion of the grid, and passes the first two tests 208, 210 of the recurring fault mode. However, the count of UVT=$U_{recovery}$ is 3, as the voltage level oscillates between t3 and t4 and falls below UVT at t4. Therefore, the recovery is categorised 212 as weak, and the LVRT curve is not reset. Instead, the conventional LVRT protection scheme is followed 204 and the second dip will result in the LVRT curve tripping and disconnection of the WTG 14.

Based upon requirements of the operator, t3 may be altered to implement more or less stringent requirements for strong recovery to be assigned. For example, if a grid is considered to be a strong grid, the recovery should be fast and stable and so t3 may be reduced. Time t3 may also be set according to grid conditions or may be predetermined during installation of the WPP 12 to account for the interconnection between the WPP 12 and the main grid 16.

Furthermore, while t3 is fixed relative to t1, an additional time, t2a, may be included in some embodiments. Time t2a designates the point at which the recovery initially crosses the UVT. If this additional time is used, then the third analysis step is performed between t2a and t4, instead of t3 and t4. This may be particularly useful in very volatile grid conditions, where the voltage may dip below UVT again before t3.

Many modifications may be made to the above examples without departing from the scope of the present invention as defined in the accompanying claims.

The invention claimed is:

1. A method for operating a wind turbine generator connected to a power network to account for recurring voltage faults on the power network caused by automatic reclosure of at least one circuit breaker following a short-circuit, the method comprising:
   identifying a deviation of voltage level of the power network from a normal operational voltage level of the power network;
   determining that the identified deviation fulfils criteria for automatic reclosure; and
   operating the wind turbine generator in a recurring fault mode if automatic reclosure criteria are fulfilled, wherein in operating the wind turbine generator in recurring fault mode, the method comprises:
      monitoring a recovery of a voltage level from the deviation;
      categorising the recovery of the voltage as one of at least a strong recovery or a weak recovery by:
         applying one or more tests to the recovery, wherein the recovery is a strong recovery when the recovery passes at least one test of the one or more tests, wherein the recovery is a weak recovery when the recovery does not pass one or more of the tests; and
      implementing a ride-through protocol according to the category of the recovery.

2. The method of claim 1, wherein the deviation comprises a power network fault, and determining that the deviation fulfils criteria for automatic reclosure comprises comparing voltage levels following the fault with a predetermined reclosure threshold.

3. The method of claim 1, wherein the one or more tests comprises comparing the voltage level with a first voltage threshold, and wherein the test is passed if the voltage level exceeds the first voltage threshold in a predetermined first time period.

4. The method of claim 3, wherein the one or more tests further comprises comparing the voltage level with a second voltage threshold, and wherein the test is passed if the voltage level exceeds the second voltage threshold in a predetermined second time period.

5. The method of claim 4, wherein the second voltage threshold is greater than the first voltage threshold.

6. The method of claim 4, wherein the first and second time periods are concurrent and of equal length.

7. The method of claim 4, wherein the one or more tests further comprises comparing the voltage level with a third voltage threshold and performing a count of a number of times that the voltage level is equal to the third voltage threshold within a third predetermined time period, and wherein the test is passed if the count is zero or an even number.

8. The method of claim 7, wherein the second and third voltage thresholds are the same.

9. The method of claim 7, wherein the third time period follows at least one of the first time period or the second time period.

10. The method of claim 1 comprising:
    determining that the deviation of voltage level fulfils a low-voltage criteria; and
    entering a low-voltage mode if the low-voltage criteria are fulfilled, the low-voltage mode being configured to run concurrently with the recurring fault mode, wherein:
    if the voltage recovery is categorised as weak recovery, the step of implementing a ride-through protocol comprises terminating the recurring fault mode and operating the wind turbine generator in low-voltage mode only.

11. The method of claim 1 comprising:
    determining that the deviation of voltage level fulfils a low-voltage criteria; and
    entering a low-voltage mode if the low-voltage criteria are fulfilled, the low-voltage mode being configured to run concurrently with the recurring fault mode, and wherein:
    if the voltage recovery is categorised as strong recovery, the step of implementing a ride-through protocol comprises altering the low-voltage mode to account for a subsequent voltage dip.

12. The method of claim 11, wherein altering the low-voltage mode comprises restarting the low-voltage mode before automatic reclosure to prevent the wind turbine generator from being disconnected in an event of another voltage deviation.

13. The method of claim 1 comprising identifying a further voltage deviation and operating the wind turbine generator in recurring fault mode in relation to the further voltage deviation.

14. The method of claim 1 comprising terminating recurring fault mode if voltage levels return to normal operational levels.

15. A computer program product downloadable from a communication network and/or stored on a machine readable medium, comprising program code instructions for implementing an operation of a wind turbine generator connected to a power network to account for recurring voltage faults on the power network caused by automatic reclosure of at least one circuit breaker following a short-circuit, the operation comprising:
    identifying a deviation of voltage level of the power network from a normal operational voltage level of the power network;
    determining that the identified deviation fulfils criteria for automatic reclosure; and
    operating the wind turbine generator in a recurring fault mode if automatic reclosure criteria are fulfilled, wherein in operating the wind turbine generator in recurring fault mode, wherein the operating comprises:
       monitoring a recovery of the voltage level from the deviation;
       categorising the recovery of the voltage as one of at least a strong recovery or a weak recovery by:
          applying one or more tests to the recovery, wherein the recovery is a strong recovery when the recovery passes at least one test of the one or more tests, wherein the recovery is a weak recovery when the recovery does not pass one or more of the tests; and
       implementing a ride-through protocol according to the category of the recovery.

16. An apparatus, comprising:
    a wind turbine generator connected to a power network; and
    a wind turbine controller configured to perform an operation of the wind turbine generator to account for recurring voltage faults on the power network caused by automatic reclosure of at least one circuit breaker following a short-circuit, the operation comprising:
       identifying a deviation of voltage level of the power network from a normal operational voltage level of the power network;

determining that the identified deviation fulfils criteria for automatic reclosure; and operating the wind turbine generator in a recurring fault mode if automatic reclosure criteria are fulfilled, wherein in operating the wind turbine generator in recurring fault mode, wherein the operating comprises:

monitoring a recovery of the voltage level from the deviation;

categorising the recovery of the voltage as one of at least a strong recovery or a weak recovery by:
applying one or more tests to the recovery, wherein the recovery is a strong recovery when the recovery passes at least one test of the one or more tests, wherein the recovery is a weak recovery when the recovery does not pass one or more of the tests; and implementing a ride-through protocol according to the category of the recovery.

* * * * *